Sept. 19, 1939.　　　A. P. LEINEN　　　2,173,172
FIXTURE ALIGNER
Filed June 20, 1938

Inventor:
Arthur P. Leinen
By Ambs, Thiess, Olson & Mecklenburger
Attys.

Patented Sept. 19, 1939

2,173,172

UNITED STATES PATENT OFFICE 2,173,172

FIXTURE ALIGNER

Arthur P. Leinen, Chicago, Ill., assignor to Benjamin Electric Mfg. Company, Des Plaines, Ill., a corporation of Illinois Application June 20, 1938, Serial No. 214,765

2 Claims. (Cl. 248—343)

This invention relates to a fixture aligner.

One of the objects of this invention is the provision of a fixture aligner having greater freedom of movement than those that have been previously described.

An addiitonal object of this invention is the provision of a fixture aligner which has a minimum amount of projection into the conduit box to which it may be attached.

A still further object of this invention is the provision of a fixture aligner which may be readily installed with standard conduit boxes and which will permit an ordinary pull chain switch to be attached directly thereto.

Additional and further objects will appear from the following description and the appended claims.

For a more complete understanding of this invention, reference will now be had to the drawing, wherein.

Figure 1:
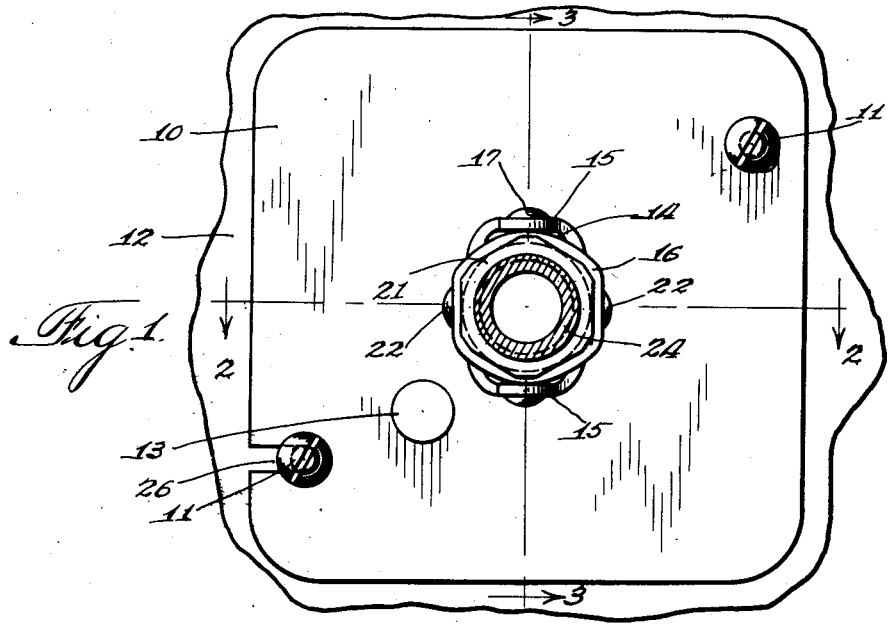
Figure 1 is a plan view of the fixture aligner and plate of this invention.
Figure 2:
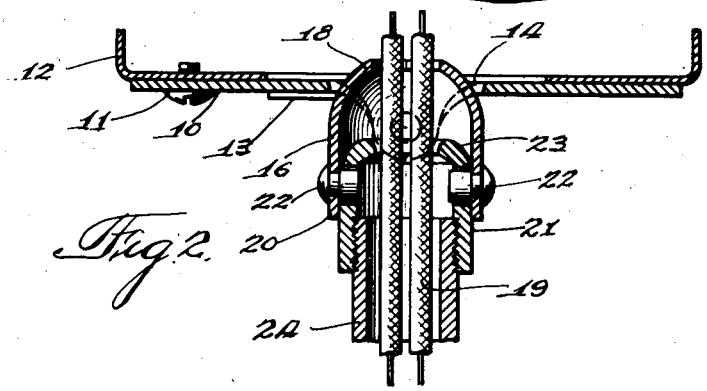
Fig. 2 is a section taken along the line 2—2 of Fig. 1 and showing wires inserted through the aligner.
Figure 3:
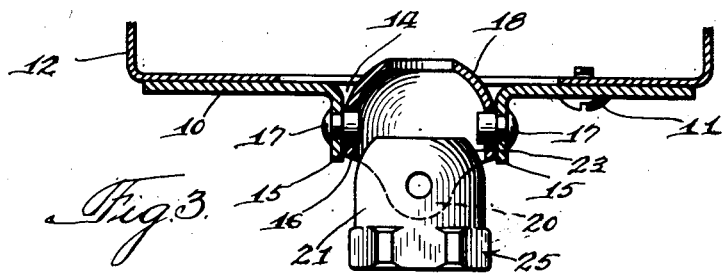
Fig. 3 is a partial sectional view taken along the line 3—3 of Fig. 1.

Referring now to the drawing in detail, a supporting plate 10 is provided which may be of sheet metal and attached by means of screws 11 to any suitable outlet box 12. If desired, the plate 10 may contain a knockout 13 which may be employed for the insertion of a pull switch (not shown) into the plate 10. The center of the plate contains a hole 14, from the edges of which depend suitable ears 15. A tubular member 16 adaptable to be inserted in the hole 14 and pivoted on the ears 15 by suitable rivets or bolts 17 is provided. The portion of the tubular member 16 extending into the outlet box 12 preferably has converging ends 18 in order to protect the cord or wires 19 inserted therethrough from chafing on the plate 10 when the tubular member 16 is pivoted in relation to the plate and to keep the opening 14 closed when the fixture stem is inclined with respect to the plate 10. The opposite downwardly extending portion of the first tubular member 16 also has ears 20 on which may be pivotally mounted a second tubular member 21 by means of suitable rivets or studs 22. The second tubular member 21 is pivoted on the first tubular member 16 in such a fashion that it will freely swing at right angles to the direction in which the first tubular member 16 swings on the ears 15 of the plate 10.

The second tubular member 21 may, if desired, also have converging ends 23 in the portion inserted within the first tubular member 16 in order to prevent chafing of the cord 19 inserted through the fixture and to prevent the opening up of joints between the tubular members. The second tubular member 21 may be threaded in order to permit the attachment of any suitable fixture or fixture stem 24. Both tubular members 16 and 21 may be formed of sheet metal. The downwardly extending outer edges 25 of the second tubular member 21 may be shaped to fit a wrench if desired to facilitate screwing the stem 24 into the tubular member 21.

It will be observed from the above description that a fixture aligner has been provided which will permit free and ready movement of the fixture in relation to the box in any desired direction. The elements of the aligner extend into the conduit box only to a slight extent and are so shaped as to prevent chafing of the wire on any of the parts of the conduit box when the fixture is rotated in any direction within predetermined limits.

The aligner of this invention may be attached to any standard conduit box by means of screws 11. A slot 26 in the plate 10 eliminates the necessity of removing more than one screw when attaching the plate to the outlet box 12.

While a particular embodiment of this invention is shown above, it will be understood, of course, that the invention is not to be limited thereto since many modifications may be made, and it is contemplated, therefore, to cover any such modifications as fall within the true spirit and scope of this invention as defined by the appended claims.

I claim:

1. A fixture aligner comprising an outlet box cover having a central opening and downwardly extending oppositely disposed ears depending from the margin of said opening, an inverted cup-like member substantially the same diameter as said opening and pivotally mounted on said ears with its closed end arcuate in cross section to substantially close said opening in any position of pivotal adjustment without extending materially above said cover, said member having dependent, transversely positioned, oppositely disposed ears, a second inverted cup-like member pivotally mounted between said dependent ears with its closed end arcuate in cross section to substantially close the open end of said first member in any position of adjustment, the open end of said last member being adapted to support a fixture stem in axial alignment with both members, both of said members having axially aligned conductor openings therethrough.

2. A fixture aligner comprising a supporting plate having a substantially circular opening and downwardly extending, oppositely disposed ears depending from the margins of said opening, a tubular member pivotally mounted on said ears, the walls of the upper end of said member being arcuate from a center substantially coincident with the pivotal axis to substantially close said opening in any position of pivotal adjustment, a second tubular member having a similar arcuate walled upper end adapted to close the open end of said first member and transversely pivoted to the side walls thereof, said second member having means for supporting a fixture stem in alignment therewith, said members providing a restricted axial conductor opening through said aligner.

ARTHUR P. LEINEN.